United States Patent

Ginn et al.

[11] Patent Number: 6,137,475
[45] Date of Patent: Oct. 24, 2000

[54] POINTING STICK HAVING AN INTERPOSER CONNECTING LAYER

[75] Inventors: Steven N. Ginn, Granger; James N. Hufford; John Zdanys, Jr., both of Elkhart, all of Ind.

[73] Assignee: CTS Corporation, Elkhart, Ind.

[21] Appl. No.: 09/082,700

[22] Filed: May 21, 1998

[51] Int. Cl.[7] .................................................. G09G 5/08
[52] U.S. Cl. ..................... 345/161; 74/471 XY; 345/156; 200/6 A
[58] Field of Search ..................................... 345/161, 168, 345/156–157; 74/471 XY; 341/20, 22; 200/6 A; 439/44, 74–75, 47

[56] References Cited

U.S. PATENT DOCUMENTS

| | | | |
|---|---|---|---|
| Re. 35,016 | 8/1995 | Gullman et al. ............... | 73/862.041 |
| 4,680,577 | 7/1987 | Straayer et al. ............... | 345/60 |
| 4,876,524 | 10/1989 | Jenkins ............... | 338/2 |
| 5,407,285 | 4/1995 | Franz ............... | 400/490 |
| 5,473,347 | 12/1995 | Collas et al. ............... | 345/169 |
| 5,489,900 | 2/1996 | Cali et al. ............... | 341/34 |
| 5,521,596 | 5/1996 | Selker et al. ............... | 341/22 |
| 5,659,334 | 8/1997 | Yaniger et al. ............... | 345/156 |
| 5,889,507 | 3/1999 | Engle et al. ............... | 345/161 |
| 5,924,875 | 7/1999 | Tighe et al. ............... | 439/74 |
| 6,002,388 | 12/1999 | Seffernick et al. ............... | 345/161 |

*Primary Examiner*—Richard A. Hjerpe
*Assistant Examiner*—Frances Nguyen
*Attorney, Agent, or Firm*—Mark P. Bourgeois; Mark W. Borgman

[57] ABSTRACT

A pointing device for controlling the positioning, movement and operation of a cursor on the display screen. Specifically, the device has a base with an end of a shaft mounted therein. Resistors and conductive pads are mounted on the base. A cable is provided with several electrical conductors and an interposer is mounted between the cable and the base for electrically connecting the resistors and the pads to the conductors. The interposer provides an electrical path between the resistors and the conductors. The interposer can be a conductive film adhesive or a pressure sensitive adhesive having vias filled with a conductive epoxy.

5 Claims, 3 Drawing Sheets

POINTING STICK HAVING AN INTERPOSER CONNECTING LAYER

CROSS REFERENCE TO RELATED AND CO-PENDING APPLICATIONS

BACKGROUND OF THE PREFERRED EMBODIMENT(S)

1. Field of the Preferred Embodiment(s)

This invention generally relates to a pointing device for controlling the positioning, movement and operation of a cursor on a display screen. Specifically, there is a pointing stick, an interposer, resistor based strain gages and a flex cable.

The following applications are herein incorporated by reference for supportive and related teachings:

- U.S. patent application Ser. No. 08/1717517, filed Sep. 23, 1996 is a collar mounted pointing stick and has the same assignee as the present invention.
- U.S. patent application Ser. No. 08/756202, filed Nov. 25, 1996 is a pointing stick with z-axis actuation and has the same assignee as the present invention.
- U.S. patent application Ser. No. 08/938274, filed Sep. 26, 1997 is a unified bodied z-axis pointing stick and has the same assignee as the present invention.
- U.S. patent application Ser. No. 08/794703, filed Feb. 4, 1997 is a z-axis pointing stick with ESD protection and has the same assignee as the present invention.

2. Description of the Related Art

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. That manufacturer may also provide two upwardly extending "mouse" or "click" buttons immediately below the space bar.

Despite the advantages of each type of prior art cursor control, none have been easily or economically manufactured. In particular, providing the electrical connections between the resistors and the flexible cable which connects to a computer mother board has been complicated and expensive. The electrical connections typically employ hand soldering or screening solder paste and then reflowing the solder paste in a reflow oven. Therefore, there is a current unmet and heretofore long felt need for a pointing stick, which is easily connected to a flexible cable.

DESCRIPTION OF RELATED ART

Examples of patents related to the present invention are as follows, and each patent is herein incorporated by reference for the supporting teachings:

U.S. Pat. No. Re. 35,016, is a three-axis force measurement stylus.

U.S. Pat. No. 4,680,577, is a multipurpose key switch for controlling cursor movement on a CRT display and for character entry includes a key cap that moves laterally to provide cursor control and that moves vertically for character entry.

U.S. Pat. No. 4,876,524, is an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

U.S. Pat. No. 5,407,285, is an apparatus for use in a computer keyboard for cursor control.

U.S. Pat. No. 5,473,347, is a computer pointing device for controlling the positioning, movement and operation of a cursor on the display screen of a computer.

U.S. Pat. No. 5,489,900, is a strain sensitive columnar transducer for a data entry keyboard containing a column upstanding from the keyboard.

U.S. Pat. No. 5,521,596, is a sensor device placed either underneath a key cap or a key on a keyboard or between two keys on a keyboard so that cursor movement may be carried out from the keyboard itself.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF THE PREFERRED EMBODIMENT(S)

It is a feature of the invention to provide a pointing and signaling device for controlling the positioning, movement and operation of a cursor on the display screen.

A further feature of the invention is to provide a device which generates electrical signal in response to a users force or actuation. The device has a shaft which has a first and second end. The user applies a force to a shaft of a given magnitude and direction. The device has a base having the first end of the shaft mounted therein. A plurality of resistors and conductive pads is mounted on the base. A cable has a plurality of electrical conductors and an interposer is mounted between the cable and the base for electrically connecting the resistors to the conductors. The interposer can be a conductive film adhesive or a pressure sensitive adhesive having a plurality of vias filled with a conductive epoxy. The cable is a flexible cable.

Another feature of the invention is to provide a device which interconnects cables to other structures such as a substrate or base.

The invention resides not in any one of these features per se, but rather in the particular combination of all of them herein disclosed and claimed and it is distinguished from the prior art in this combination of all of its structures for the functions specified.

There has thus been outlined, rather broadly, the more important features of the invention so that the detailed description thereof that follows may be better understood, and so that the present contribution to the art may be better appreciated. There are, of course, additional features of the invention that will be described hereinafter and which will form the subject matter of the appended claims. Those skilled in the art will appreciate that the preferred embodiment may readily be used as a basis for the designing of other structures, methods and systems for carrying out the several purposes of the present invention. It is important, therefore, that the claims are regarded as including such equivalent constructions since they do not depart from the spirit and scope of the present invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
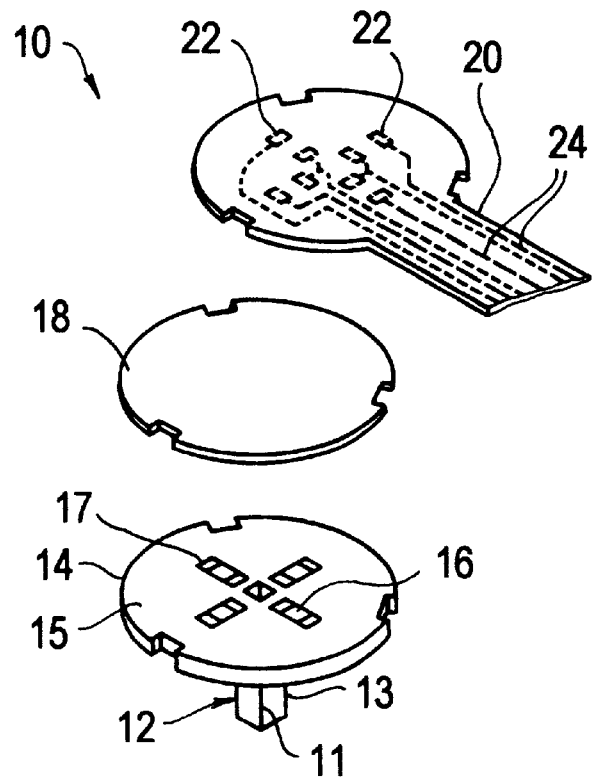
FIG. 1 is a perspective exploded view of the low cost pointing stick.
Figure 2:
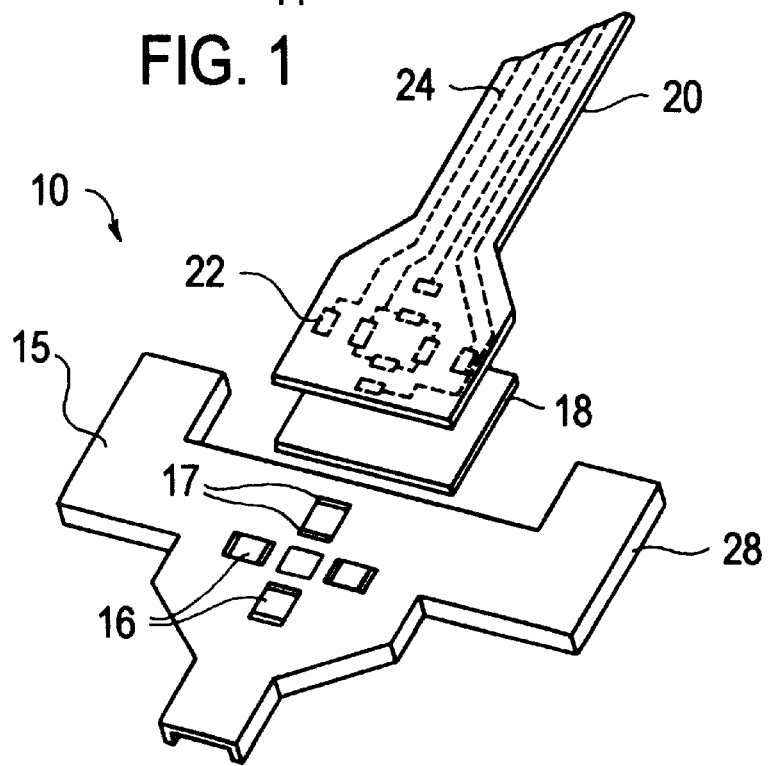
FIG. 2 is a perspective exploded view of an alternative embodiment of the low cost pointing stick.

Referring to both FIGS. 1 and 2, there is a pointing stick assembly 10 that can be used to control the movement of a cursor on a computer screen. In particular, the pointing stick assembly 10 has a stick or shaft 12 and a base 14 attached to the shaft 12. The shaft 12 has an end 11 and an end 13. Several strain gauge resistors 16 and conductive pads 17 are screen printed and cured, using conventional resistor processing, onto the top surface 15 of the base 14. A flexible circuit cable 20 has several electrical contacts or terminals or conductors 22 and circuit lines 24 extending from the contacts 22 along the length of the cable 20. An interposer 18 is mounted between the cable 20 and the base 14 for electrically connecting the resistors 16 to the contacts 22.

Interposer 18 may be made of a conventional conductive film adhesive such as z-axis film adhesive 5303R commercially available from 3M Corporation of Minneapolis Minn. The z-axis film adhesive is electrically conductive along its thickness and is insulative along its length and width axes. Interposer 18 is die cut to a shape that matches base 14 and is placed between flexible cable 20 and base 14 so that conductors 22 are electrically coupled to pads 17. Interposer 18 is bonded to flex cable 20 and base 14 by applying heat and pressure to the overall assembly 10 in a mold or press for approximately 30 seconds. The heat and pressure activates an adhesive in the interposer 18 that creates a bond between interposer 18, base 14 and flexible cable 20.

FIG. 2 shows an alternative embodiment of pointing stick assembly 10 with base 28 having a different configuration. Base 28 has a Y-shape that allows for better mechanical isolation of the pointing stick from a keyboard. The isolation may be needed to minimize the effects of bending stresses and vibration from the keyboard which may cause spurious signals.

Figure 3:
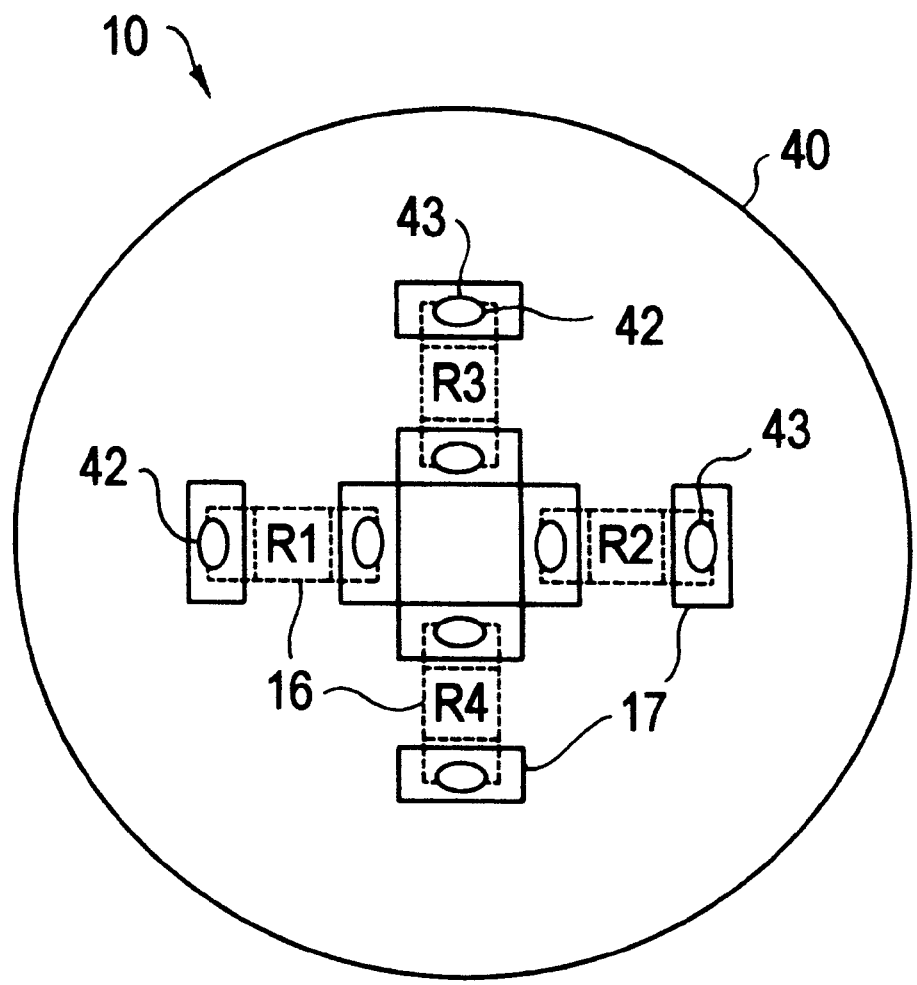
FIG. 3 is a top view of a base and interposer of another embodiment of a pointing stick.
Figure 4:
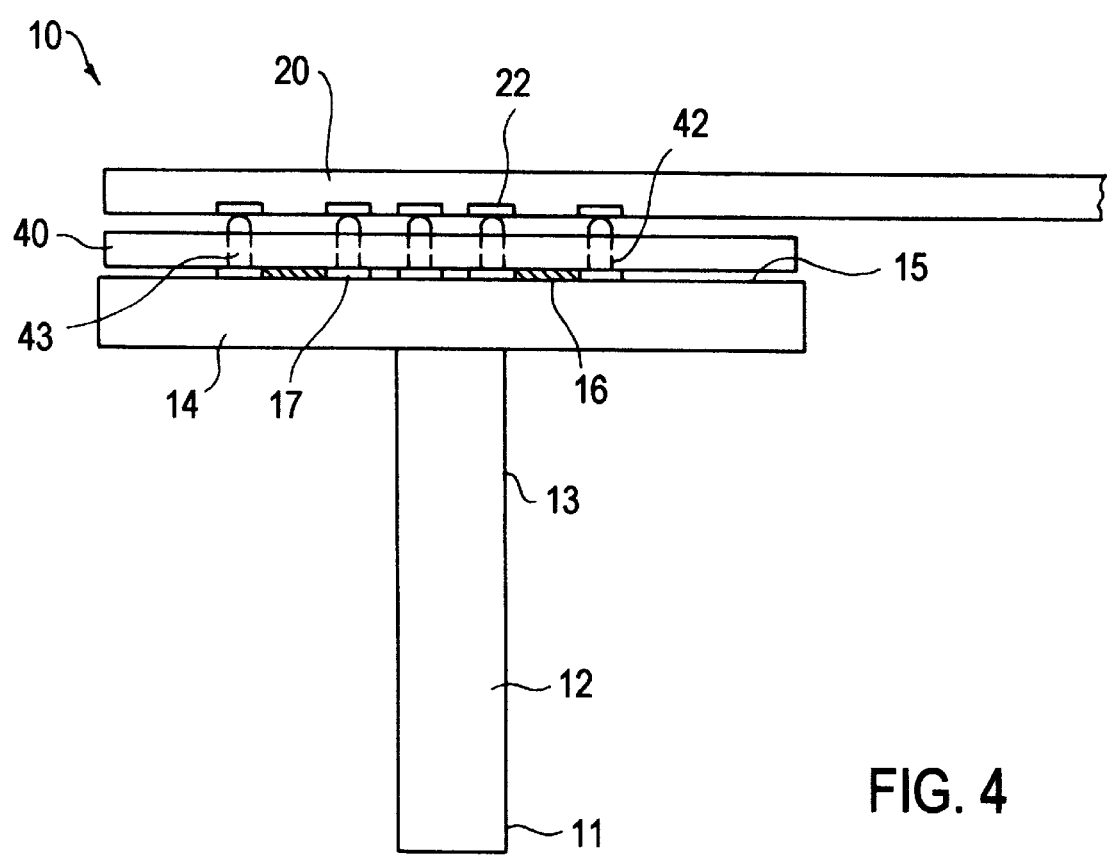
FIG. 4 is a side view of FIG. 3 including a flex cable.

Referring to both FIGS. 3 and 4, there is another embodiment of the pointing stick assembly 10 shown. In particular, pointing stick assembly 10 has a shaft 12 and a base 14 attached to stick 12. The shaft has a first end 11 and a second end 13. Several strain gauge resistors 16 and conductive pads 17 are screen printed and cured onto the top surface 15 of the base 14 using conventional resistor processing. A flexible circuit cable 20 has several electrical contacts or terminals or conductors 22 and circuit lines (not shown) extending from the contacts 22 along the length of the cable 20. An interposer 40 is mounted between cable 20 and base 14 for electrically connecting resistors 16 to contacts 22. In the embodiment of FIGS. 3 and 4, the interposer 40 is a double sided pressure sensitive adhesive having a plurality of vias 42 filled with a conductive epoxy 43.

The pointing stick 10 with interposer 40 of FIGS. 3 and 4 is assembled by screening and curing the resistors 16 and conductive pads 17 onto base 14. The pressure sensitive adhesive interposer 40 is die punched with via holes 42 in the proper location and attached to base 14. Next, the conductive epoxy 43 is screen printed into the vias 42. The flex cable 20 is then placed over the interposer 40 and pressed. The assembly 10 is then placed in a curing oven to cure conductive epoxy 43. The pressure sensitive adhesive interposer 40 eliminates having to place each individual assembly 10 into a mold for curing as with interposer 18. Using interposer 40, large quantities of assembly 10 can be cured simultaneously in an oven resulting in lower cost of production.

It is noted that the pointing stick assembly 10 has the strain gages resistors 16 coupled to electrical wires 24 for sending signals, which are generated in response to sensed strain, to an analysis circuit (not shown). Generally, stick 12 is perpendicular to base 14 and is attached to the base via a bonding material (not shown). Moreover, the strain gages are made of thick film piezo-resistive material, which are applied using known screen techniques.

VARIATIONS OF THE PREFERRED EMBODIMENT(S)

One of ordinary skill in the art of making pointing sticks will realize that there are many different ways of accomplishing the preferred embodiment. For example, although it is contemplated to make shaft 12 and base 14 out of molded plastic material, any suitable material would work, like ceramics or other insulators. Additionally, although a flexible cable 20 is illustrated, other types of cables such as insulation displacement cables or ribbon cables may be used.

It is further possible to have vias 42 filled with other materials besides conductive epoxy such as solder, copper or conductive plastic. It is further possible to have the interposer 18 or 40 interface with something other than a flex cable, for example the interposer could interface with a connector, a terminal pin, a leadframe or a printed circuit board or a silicon integrated circuit.

Even though the specification has shown the shaft or stick extending below the base, it is considered equivalent to have the shaft extending upwardly.

Another variation of the preferred embodiment is to use an interposer that is larger or smaller than the base.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A device for generating electrical signals in response to forces applied thereon, comprising:

a) a shaft, having a first and second end;
b) a base having the first end of the shaft mounted thereto;
c) a plurality of resistors mounted on the base, around the shaft, for generating an electrical signal representative of force applied to the shaft;
d) a pair of conductive pads mounted on the base and electrically attached to each resistor;
e) an interposer mounted to the base, the interposer including:
   e1) a pressure sensitive adhesive for attaching to the base;
   e2) a plurality of vias extending through the pressure sensitive adhesive;
   e3) a conductive epoxy disposed in each via forming an electrically conductive path through each via; and
f) a cable, having a plurality of electrical conductors, mounted to the interposer, the conductive path connected to the conductive pads and the electrical conductors such that the electrical signals are electrically routed from the pads through the conductive path and to the conductors.

2. The device according to claim 1, wherein the cable is a flexible cable.

3. A device for electrically and mechanically connecting a cable to a base comprising:

a) a base;
b) at least two resistors mounted on the base for generating electrical signals representative of force applied to the base;
c) at least two conductive pads mounted on the base adjacent each of the resistors, respectively;
d) an interposer, mounted to the base, the interposer electrically conductive in one axis and insulative in two other axes; and
e) a cable having a plurality of electrical conductors is mounted to the interposer such that the electrical signals are electrically routed from the pads through the interposer to the conductors.

4. The device according to claim 3, wherein the interposer comprises:

a) a pressure sensitive adhesive;
b) a plurality of vias extending through the pressure sensitive adhesive; and
c) a conductive epoxy disposed in each via and operable to form an electrically conductive path through each via.

5. The device according to claim 3, wherein the cable is a flexible cable.

* * * * *